US010180764B2

(12) United States Patent
Halliday et al.

(10) Patent No.: US 10,180,764 B2
(45) Date of Patent: *Jan. 15, 2019

(54) GRAPHICAL USER INTERFACES FOR SUPPORTING COLLABORATIVE GENERATION OF LIFE STORIES

(75) Inventors: Andrew Halliday, Soquel, CA (US); Christopher Lunt, Mountain View, CA (US)

(73) Assignee: Google LLC, Mountain View, CA (US)

(*) Notice: Subject to any disclaimer, the term of this patent is extended or adjusted under 35 U.S.C. 154(b) by 704 days.

This patent is subject to a terminal disclaimer.

(21) Appl. No.: 13/620,238

(22) Filed: Sep. 14, 2012

(65) Prior Publication Data
US 2013/0104056 A1 Apr. 25, 2013

Related U.S. Application Data

(63) Continuation of application No. 13/600,160, filed on Aug. 30, 2012, now Pat. No. 8,775,951, which is a
(Continued)

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/0484* (2013.01); *G06F 17/30064* (2013.01);
(Continued)

(58) Field of Classification Search
CPC . G06F 3/0481; G06F 17/30064; G06Q 10/10; G06Q 10/109; G06Q 50/01; G06Q 30/02; G06Q 10/06
(Continued)

(56) References Cited

U.S. PATENT DOCUMENTS 5,157,768 A 10/1992 Hoeber et al.
5,287,448 A 2/1994 Nicol et al.
(Continued)

FOREIGN PATENT DOCUMENTS

| EP | 1847951 A1 | 10/2007 |
|---|---|---|
| WO | 2005119992 A | 12/2005 |
| WO | WO 2006/098588 A1 | 9/2006 |

OTHER PUBLICATIONS

Benford et al., Designing Storytelling Technologies to Encourage Collaboration Between Young Children, ACM 2000, pp. 556-573.
(Continued)

*Primary Examiner* — Patrick F Riegler
(74) *Attorney, Agent, or Firm* — Lowenstein Sandler LLP

(57) ABSTRACT

Systems and methods for modifying a social timeline are described. A method for modifying a social timeline includes generating data to display a timeline graphic. The time graphic includes a chronology bar that is associated with at least two dates. The method further includes associating image data with the at least two dates to display images along the timeline graphic. The images describe a life story of an account holder. The method includes generating data to allow the account holder to post a comment to the life story along the timeline graphic.

16 Claims, 10 Drawing Sheets

Related U.S. Application Data continuation of application No. 11/383,112, filed on May 12, 2006, now Pat. No. 8,793,579, said application No. 13/620,238 is a continuation of application No. 11/383,123, filed on May 12, 2006, now Pat. No. 8,689,098.

(60) Provisional application No. 60/745,231, filed on Apr. 20, 2006.

(51) Int. Cl.

| | | |
|---|---|---|
| *G06Q 10/10* | (2012.01) | |
| *G06F 3/0484* | (2013.01) | |
| *G06F 17/30* | (2006.01) | |
| *G06Q 50/00* | (2012.01) | |
| *H04L 12/58* | (2006.01) | |
| *H04L 29/08* | (2006.01) | |
| *G06Q 30/02* | (2012.01) | |
| *G06F 3/01* | (2006.01) | |
| *G06Q 10/06* | (2012.01) | |

(52) U.S. Cl.
CPC .......... *G06Q 10/10* (2013.01); *G06Q 10/109* (2013.01); *G06Q 50/01* (2013.01); *H04L 51/32* (2013.01); *H04L 67/22* (2013.01); *G06F 3/01* (2013.01); *G06F 3/048* (2013.01); *G06F 17/30551* (2013.01); *G06Q 10/06* (2013.01); *G06Q 30/02* (2013.01); *H04L 67/306* (2013.01); *H04M 2203/655* (2013.01)

(58) Field of Classification Search
USPC ........................................... 715/751
See application file for complete search history.

(56) References Cited

U.S. PATENT DOCUMENTS

| | | | |
|---|---|---|---|
| 5,465,378 A | 11/1995 | Duensing et al. | |
| 5,819,032 A | 10/1998 | de Vries et al. | |
| 5,850,219 A | 12/1998 | Kumomura | |
| 5,913,212 A | 6/1999 | Sutcliffe et al. | |
| 5,923,325 A | 7/1999 | Barber et al. | |
| 5,938,724 A | 8/1999 | Pommier et al. | |
| 5,949,413 A | 9/1999 | Lerissa et al. | |
| 6,026,148 A | 2/2000 | Dworkin et al. | |
| 6,222,534 B1 | 4/2001 | Ohishi et al. | |
| 6,230,324 B1 | 5/2001 | Tomita et al. | |
| 6,340,978 B1 | 1/2002 | Mindrum | |
| 6,405,197 B2 | 6/2002 | Gilmour | |
| 6,408,309 B1 | 6/2002 | Agarwal | |
| 6,694,302 B2 | 2/2004 | Chuang et al. | |
| 6,701,322 B1 | 3/2004 | Green | |
| 6,760,884 B1 | 7/2004 | Vertelney et al. | |
| 6,803,925 B2 | 10/2004 | Vronay | |
| 6,848,077 B1 | 1/2005 | McBrearty et al. | |
| 6,874,126 B1 | 3/2005 | Lapidous | |
| 6,900,807 B1 | 5/2005 | Liongosari et al. | |
| 6,901,379 B1 | 5/2005 | Balter et al. | |
| 6,976,229 B1 | 12/2005 | Balabanovic et al. | |
| 6,996,782 B2 | 2/2006 | Parker et al. | |
| 7,069,003 B2 | 6/2006 | Lehikoinen et al. | |
| 7,194,411 B2 | 3/2007 | Slotznick et al. | |
| 7,213,206 B2 | 5/2007 | Fogg | |
| 7,284,191 B2 | 10/2007 | Grefenstette et al. | |
| 7,287,225 B2 | 10/2007 | Mindrum | |
| 7,305,436 B2 | 12/2007 | Willis | |
| 7,321,883 B1 | 1/2008 | Freedy et al. | |
| 7,337,172 B2 | 2/2008 | Shapiro | |
| 7,366,759 B2 | 4/2008 | Trevithick et al. | |
| 7,421,449 B2 | 9/2008 | Williams et al. | |
| 7,424,669 B2 | 9/2008 | Bhogal et al. | |
| 7,506,262 B2 | 3/2009 | Gupta et al. | |
| 7,558,853 B2 | 7/2009 | Alcorn et al. | |
| 7,567,977 B1 | 7/2009 | White | |
| 7,725,492 B2 | 5/2010 | Sittig et al. | |
| 7,765,265 B1 | 7/2010 | Granito | |
| 7,810,021 B2 | 10/2010 | Paxson | |
| 7,818,392 B1 | 10/2010 | Martino et al. | |
| 7,844,671 B1 | 11/2010 | Lawler et al. | |
| 8,099,433 B2 | 1/2012 | Sittig et al. | |
| 8,103,947 B2 | 1/2012 | Lunt et al. | |
| 8,689,098 B2 | 4/2014 | Halliday et al. | |
| 8,775,951 B2 | 7/2014 | Halliday et al. | |
| 8,793,579 B2 | 7/2014 | Halliday et al. | |
| 8,954,432 B2 | 2/2015 | Frigon | |
| 2001/0047373 A1 | 11/2001 | Jones et al. | |
| 2002/0052768 A1 | 5/2002 | Walker et al. | |
| 2002/0103822 A1 | 8/2002 | Miller | |
| 2002/0120757 A1* | 8/2002 | Sutherland et al. | 709/229 |
| 2002/0152245 A1 | 10/2002 | McCaskey et al. | |
| 2002/0169769 A1 | 11/2002 | Jackson | |
| 2002/0178185 A1 | 11/2002 | Kuchinsky et al. | |
| 2003/0046318 A1 | 3/2003 | Schohn et al. | |
| 2003/0055871 A1 | 3/2003 | Roses | |
| 2004/0098754 A1 | 5/2004 | Vella et al. | |
| 2004/0143603 A1 | 7/2004 | Kaufmann et al. | |
| 2004/0153445 A1 | 8/2004 | Horvitz et al. | |
| 2004/0194034 A1 | 9/2004 | Viamis | |
| 2004/0199867 A1 | 10/2004 | Brandenborg | |
| 2004/0205065 A1 | 10/2004 | Petras et al. | |
| 2004/0221309 A1 | 11/2004 | Zaner et al. | |
| 2005/0055625 A1 | 3/2005 | Kloss | |
| 2005/0057584 A1 | 3/2005 | Gruen et al. | |
| 2005/0060166 A1 | 3/2005 | Durham et al. | |
| 2005/0182773 A1 | 8/2005 | Feinsmith | |
| 2005/0192913 A1 | 9/2005 | Lubart | |
| 2005/0193347 A1 | 9/2005 | Van Dam | |
| 2005/0197846 A1 | 9/2005 | Pezaris et al. | |
| 2005/0198031 A1* | 9/2005 | Pezaris | H04L 12/588 |
| 2005/0203801 A1 | 9/2005 | Morgenstern et al. | |
| 2005/0209887 A1 | 9/2005 | Pollner | |
| 2005/0216550 A1 | 9/2005 | Paseman et al. | |
| 2005/0216768 A1 | 9/2005 | Eppert | |
| 2005/0235062 A1* | 10/2005 | Lunt | G06Q 10/10 709/225 |
| 2005/0251411 A1* | 11/2005 | Ishii et al. | 705/1 |
| 2005/0268237 A1 | 12/2005 | Crane et al. | |
| 2005/0273378 A1 | 12/2005 | MacDonald-Korth et al. | |
| 2006/0036960 A1 | 2/2006 | Loui | |
| 2006/0048059 A1 | 3/2006 | Etkin | |
| 2006/0053194 A1* | 3/2006 | Schneider et al. | 709/204 |
| 2006/0064639 A1 | 3/2006 | Reid et al. | |
| 2006/0069998 A1 | 3/2006 | Artman et al. | |
| 2006/0101035 A1 | 5/2006 | Mustakallio et al. | |
| 2006/0143043 A1 | 6/2006 | McCallie, Jr. et al. | |
| 2006/0155757 A1 | 7/2006 | Williams et al. | |
| 2006/0156245 A1 | 7/2006 | Williams et al. | |
| 2006/0161556 A1 | 7/2006 | Dettinger et al. | |
| 2006/0173824 A1 | 8/2006 | Bensky et al. | |
| 2006/0224967 A1 | 10/2006 | Marmaros | |
| 2006/0230061 A1 | 10/2006 | Sample et al. | |
| 2006/0242178 A1* | 10/2006 | Butterfield et al. | 707/100 |
| 2006/0248086 A1 | 11/2006 | Pahud | |
| 2006/0250419 A1 | 11/2006 | Shiba et al. | |
| 2006/0253456 A1* | 11/2006 | Pacholec et al. | 707/10 |
| 2006/0253491 A1 | 11/2006 | Gokturk et al. | |
| 2006/0263133 A1* | 11/2006 | Engle | G06Q 10/00 400/62 |
| 2006/0277457 A1* | 12/2006 | Salkind | G06F 17/3089 715/234 |
| 2006/0277477 A1 | 12/2006 | Christenson | |
| 2006/0282306 A1 | 12/2006 | Thissen-Roe | |
| 2007/0016647 A1 | 1/2007 | Gupta et al. | |
| 2007/0019849 A1 | 1/2007 | Kaufman et al. | |
| 2007/0043688 A1 | 2/2007 | Kountz et al. | |
| 2007/0067268 A1 | 3/2007 | Dai et al. | |
| 2007/0067292 A1 | 3/2007 | Trowbridge et al. | |
| 2007/0089053 A1 | 4/2007 | Uhlig et al. | |
| 2007/0118525 A1* | 5/2007 | Svendsen | 707/9 |
| 2007/0157114 A1 | 7/2007 | Bishop | |
| 2007/0162432 A1* | 7/2007 | Armstrong | G06F 17/30867 |
| 2007/0162458 A1* | 7/2007 | Fasciano | G06Q 10/00 |

(56) References Cited

U.S. PATENT DOCUMENTS

| | | |
|---|---|---|
| 2007/0162566 A1 | 7/2007 | Desai |
| 2007/0174247 A1 | 7/2007 | Xu Zhichen et al. |
| 2007/0203644 A1 | 8/2007 | Thota |
| 2007/0214141 A1 | 9/2007 | Sittig et al. |
| 2007/0219908 A1 | 9/2007 | Martinez |
| 2007/0239761 A1 | 10/2007 | Baio et al. |
| 2007/0250479 A1 | 10/2007 | Lunt et al. |
| 2007/0250496 A1 | 10/2007 | Halliday et al. |
| 2007/0250791 A1 | 10/2007 | Halliday et al. |
| 2007/0260996 A1 | 11/2007 | Jakobson |
| 2007/0261071 A1 | 11/2007 | Lunt et al. |
| 2007/0266079 A1* | 11/2007 | Criddle ............... G06Q 10/107 709/203 |
| 2007/0266114 A1 | 11/2007 | Heo |
| 2008/0010585 A1 | 1/2008 | Schneider et al. |
| 2008/0120345 A1 | 5/2008 | Duncombe |
| 2008/0320547 A1 | 12/2008 | Lupoi et al. |
| 2009/0018867 A1 | 1/2009 | Reiner |
| 2010/0174675 A1 | 7/2010 | Mons et al. |
| 2011/0022966 A1 | 1/2011 | Rose et al. |
| 2011/0196926 A1* | 8/2011 | Crawford ..................... 709/204 |
| 2012/0096037 A1 | 4/2012 | Sittig et al. |
| 2012/0096038 A1 | 4/2012 | Sittig et al. |
| 2012/0324373 A1 | 12/2012 | Halliday et al. |
| 2013/0042177 A1* | 2/2013 | Dunko .............. H04M 1/72522 715/716 |
| 2014/0215368 A1 | 7/2014 | Halliday et al. |
| 2014/0304623 A1 | 10/2014 | Halliday et al. |

OTHER PUBLICATIONS

Brush et al., "Notification for Shared Annotation of Digital Documents," Apr. 2002, pp. 89-96.

Ellis et al., Designing Palaver Tree Online: Supporting Social Roles in a Community of Oral History, ACM 2001, pp. 474-481.

Jones, A Biographic Researcher in Pursuit of an Aesthetic: The User of Art-Based (re) Presentations in "Performative" Dissemination of Life Stories, Google Apr. 2006, pp. 66-85.

Marrs et al., Just-in-Time Teaching in Biology: Creating an Active Learner Classroom Using the Internet, Google 2004, pp. 49-61.

Mazalek et al., Tangible Viewpoints: A Physical Approach to Multimedia Stories, ACM 2002, pp. 153-160.

Radev et al., Ranking Suspected Answers to Natural Language Questions Using Predictive Annotation, Google 2000, pp. 150-157.

"Today, someone needs you. Tomorrow . . . you may need someone too," http://www.wisdomlegacy.org/HeresHowitWorks.aspx, Mar. 17, 2006.

U.S. Appl. No. 11/415,691, filed May 2, 2006; Christopher Lunt; Notice of Allowance dated Sep. 20, 2011.

U.S. Appl. No. 11/415,691, filed May 2, 2006; Christopher Lunt; Notice of Allowance dated Oct. 11, 2011.

U.S. Appl. No. 11/415,691, filed May 2, 2006; Christopher Lunt; Office Action dated Aug. 4, 2009.

U.S. Appl. No. 11/415,691, filed May 2, 2006; Christopher Lunt; Office Action dated May 19, 2011.

U.S. Appl. No. 11/383,112, filed May 12, 2006; Andrew Halliday; Office Action dated Jul. 8, 2009.

U.S. Appl. No. 11/383,112, filed May 12, 2006; Andrew Halliday; Office Action dated Oct. 19, 2011.

U.S. Appl. No. 11/383,112, filed May 12, 2006; Andrew Halliday; Office Action dated Apr. 22, 2011.

U.S. Appl. No. 11/383,112, filed May 12, 2006; Andrew Halliday; Office Action dated Apr. 12, 2012.

U.S. Appl. No. 11/383,123, filed May 12, 2006; Andrew Halliday; Office Action dated Sep. 15, 2009.

U.S. Appl. No. 11/383,123, filed May 12, 2006; Andrew Halliday; Office Action dated Aug. 24, 2011.

U.S. Appl. No. 11/383,123, filed May 12, 2006; Andrew Halliday; Office Action dated Mar. 9, 2012.

U.S. Appl. No. 11/383,123, filed May 12, 2006; Andrew Halliday; Office Action dated Aug. 17, 2012.

U.S. Appl. No. 11/383,134, filed May 12, 2006; Christopher Lunt; Office Action dated Sep. 17, 2009.

U.S. Appl. No. 11/383,134, filed May 12, 2006; Christopher Lunt; Office Action dated Aug. 24, 2011.

Xu et al., Evaluation of an Extraction-Based Approach to Answering Definitional Questions, ACM 2004, pp. 418-424.

"WebBiographies.com Enables People to Document Their Lives and Build Dynamic Family Trees," http://www.lexdon.com/article/WebBiographies.com_Enables_People_to_Document/45013.html, Apr. 18, 2006.

Bentley et al. "Supporting Collaborative Information Sharing with the World Wide Web. The BSCW Shared Workspace System" World Wide Web Journal Dec. 11, 1995, 10 pages, Sebastopol, CA, US, US; URL:https://www.w3org/Conferences/WWW4/Papers/151.

Bier et al. "Sparrow Web: Group-Writable Information on Structured Web Pages" New Horizons, Apr. 5-10, 2003, pp. 634-635, CHI 2003, Ft. Lauderdale, FL, US.

Walther, Michael "Supporting Development of Synchronous Collaboration Tools on the Web with GroCo" Proceedings of ERCIM workshop on CSCW and the Web, Feb. 7-9, 1996, 9 pages, Sankt Augustin, Germany.

Extended European Search report dated Aug. 20, 2007 issued in European Patent Application No. 07008121.1.

* cited by examiner

GRAPHICAL USER INTERFACES FOR SUPPORTING COLLABORATIVE GENERATION OF LIFE STORIES

CLAIM OF PRIORITY

This application is a continuation application of and claims the benefit of and priority, under 35 U.S.C. § 120, to co-pending U.S. patent application Ser. No. 13/600,160, titled "Graphical User Interfaces for Supporting Collaborative Generation of Life Stories", filed on Aug. 30, 2012, now issued as U.S. Pat. No. 8,775,951 on Jul. 8, 2014, which is a continuation application of and claims the benefit of and priority, under 35 U.S.C. § 120, to U.S. patent application Ser. No. 11/383,112, titled "Graphical User Interfaces For Supporting Collaborative Generation of Life Stories", filed on May 12, 2006, now issued as U.S. Pat. No. 8,793,579 on Jul. 29, 2014, which claims the benefit of and priority, under 35 U.S.C. § 119(e) to U.S. Provisional Patent Application No. 60/745,231, titled "Collaborative System and Method for Generating Biographical Accounts," filed Apr. 20, 2006, all of which are incorporated by reference herein in their entirety for all purposes.

This application is a continuation application of and claims the benefit of and priority, under 35 U.S.C. § 120, to co-pending U.S. patent application Ser. No. 11/383,123, titled "System and Method For Organizing Recorded Events Using Character Tags", filed on May 12, 2006, now issued as U.S Pat. No. 8,689,098 on Apr. 1, 2014, which claims the benefit of and priority, under 35 U.S.C. § 119(e) to U.S. Provisional Patent Application No. 60/745,231, titled "Collaborative System and Method for Generating Biographical Accounts," filed Apr. 20, 2006, all of which are incorporated by reference herein in their entirety for all purposes.

BACKGROUND

Flickr™ is a popular photo sharing service that is accessible over the Internet. It employs various graphical user interfaces (GUIs) to display photos uploaded by users of its service. On the home page of a user, a collection of photos that have been recently uploaded by users of the service is displayed as thumbnail images. The service also provides its users with some flexibility to personalize their home pages. For example, users can custom define groups and a section on the home page displays the thumbnail images of the most recent photos that have been recently uploaded by the users in that group. A click on any thumbnail image hyperlinks the user to a web page that provides a larger image of the photo, additional information about the photo, and the text window for inputting any comments.

Another GUI of the Flickr™ service helps users to customize the display of their photo collections according to set time periods. FIG. 1 is a schematic illustration of such a GUI. The GUI includes a display section 110 for displaying thumbnail images, a chronology bar 120, left and right controls 130, 140 for the chronology bar, and a plurality of boxes 150 underneath the chronology bar. The chronology bar 120 is displayed with dates that range from the earliest date of the photo collection to the latest date of the photo collection. As a default, thumbnail images of all photos in the collection are displayed in the display section 110. The left and right controls 130, 140 may be moved left and right using a pointing device so as to contract the date range of the photos that are displayed in the display section 110. In response to the movement of the left and right controls 130, 140, the display section 110 is updated so that only the photos with dates within the modified date range are displayed therein. A click on any thumbnail image inside the display section 110 hyperlinks the user to a web page that provides a larger image of the photo, additional information about the photo, and text windows for editing the photo title, tags, and description. Each of the boxes 150 represents graphically the number of photos for the date range that is spanned by the width of the box. More photos are represented by taller boxes. Also, when the user moves the cursor of the pointing device over a box 150, the number of photos for the date range that is spanned by the width of that box becomes displayed inside the box.

The GUIs described above facilitate the process of sharing photos and organizing them into collections, but they do not, and fundamentally cannot, support the collaborative generation of life stories, which include text narratives of events in addition to photos representative of the events. Also, the GUIs that are employed in web-based life story collection systems generally are configured to facilitate user-to-system interactions and do not support the collaborative generation of life stories.

SUMMARY

The present invention relates generally to systems and methods for recording life stories and, more particularly, to systems and methods that support the collaborative generation of life stories.

The present invention provides tools for supporting a collaborative system and method for generating life stories. These tools are embodied in GUIs that encourage and promote the collaborative generation of life stories.

A GUI according to an embodiment of the invention displays to a user the thumbnail images corresponding to the most recent life stories and comments that have been submitted by other users, so that the user can see their most recent activities with a glance. Only the thumbnail images are initially displayed on the GUI, but when the user positions a mouse pointer on top of a thumbnail image, textual information is displayed to the user, including the name or user ID of the person posting the life story or comment and the title of the life story or comment. Excerpts from the text narrative of the life story or comment may also be displayed. A click on any of thumbnail images hyperlinks the user to a web page that displays the thread containing the life story or comment and provides hyperlinks to GUIs for adding comments to life stories or responding to comments.

A GUI according to another embodiment of the invention displays to a user a timeline with various GUI controls and thumbnail images or titles corresponding to any user's life stories having dates that are within the date range of the timeline. The thumbnail images or titles corresponding to life stories are positioned above the timeline in accordance with the dates of the life stories. In one embodiment, thumbnail images are displayed on the GUI, but when the user positions a mouse pointer on top of a thumbnail image, the title of the life story and/or excerpts from the text narrative of the life story are displayed to the user. A click on any thumbnail image hyperlinks the user to a web page that displays the thread containing the life story and provides hyperlinks to GUIs for adding comments to life stories or responding to comments. In another embodiment, titles are displayed on the GUI, but when the user positions a mouse pointer on top of a title, the thumbnail image of the life story corresponding to that title is also displayed to the user. A click on the title hyperlinks the user to a web page that displays the thread containing the life story and provides hyperlinks to GUIs for adding comments to life stories or responding to comments.

With the GUIs according to embodiments of the invention, a user can easily keep track of activities of other users and make comments to their life stories or respond to their comments. Also, the user can easily view the chronology of life stories posted by any user and make comments to such user's life stories or ask questions about a particular time in such user's life history.

In a number of implementations, a method for generating a timeline graphic is described. The method includes receiving a plurality of postings from one or more users to post to an account of an account holder. The account holder is registered with a network. The postings are received over a period of time. Moreover, particular ones of the postings are shareable with one or more user groups defined by the account holder in the network. The method further includes associating groups of the postings to selected time identifiers along a timeline graphic. The groups are arranged in a chronological order along the timeline graphic. The method includes providing the arranged groups of one or more postings to the account of the account holder for display when a request for viewing the plurality of postings along the timeline graphic is received from the account holder. The method is executed by a processor.

In various implementations, the method includes determining when an interaction occurs with one of the postings. Each posting is associated with life events. The method also includes generating an image of one of the life events when the interaction with the posting occurs.

In a number of implementations, the method includes generating a notification to the account. The operation of generating occurs when one of the postings or a comment on the posting is received.

In various implementations, the method includes receiving a request from one of the users to post to the account and determining whether the user is permitted to post to the account. The permission is provided before the request is received. The method includes allowing the user to post to the account in response to determining that the user is permitted to post to the account.

In various implementations, the timeline graphic includes a chronology bar, which includes chronological ordering of year identifiers.

In a number of implementations, at least one of the postings provided along the timeline graphic includes a text narrative that is displayed when a mouse pointer is detected to be positioned over the posting.

In several implementations, the text narratives include a name of a user that generated the posting or is associated with the posting.

In multiple implementations, the text narratives include one or more comments concerning the posting.

In a number of implementations, multiple ones of the comments are displayed in a thread format.

In various implementations, each posting is an image, text, or a graphic.

In a number of implementations, the method includes detecting a selection of one of the postings. The selection provides an option to comment on the posting or to access a hyperlink that is associated with the posting.

In various implementations, the method includes receiving a posting from the account holder to post to the account.

In multiple implementations, each posting is associated with life events of the account holder or with text comments.

In a number of implementations, a method for generating a timeline is described. The method includes receiving one or more postings from one or more users, determining whether the users are permitted to post to an account of the account holder, associating the postings received from the users with one or more time identifiers in response to determining that the users are permitted to post to the account, and transmitting display data for the account that includes the postings received from the users. The postings are defined along the timeline within the account. The method is executed by a processor.

In various implementations, a method for generating a timeline includes receiving one or more postings from the account holder. The postings received from the account holder include information regarding life events of the account holder. The postings received from the users also include information regarding life events of the account holder. The method includes transmitting display data for the account that includes the postings received from the account holder. The postings received from the account holder are defined along the timeline. The operation of transmitting the display data including the postings received from the account holder and the users is performed to display a life story of the account holder along the timeline.

In various implementations, the timeline includes a chronology bar and the chronology bar includes dates associated with the postings received from the users.

In a number of implementations, each posting is an image, text, or a graphic.

In various implementations, a method for generating a timeline includes providing access to the account in response to receiving a user identification and a user password of the account holder.

In a number of implementations, a method for generating a timeline includes determining whether approval to post the postings received from the users within the account is required from the account holder before transmitting the display data that includes the postings received from the users. The operation of transmitting the display data including the postings received from the users is performed in response to determining that the approval is not required.

In various implementations, a method for generating a timeline includes receiving one or more postings from an account holder, receiving one or more postings from one or more users, and determining whether the users are permitted to post to an account of the account holder. The method further includes associating the postings received from the users with one or more time identifiers in response to determining that the users are permitted to post to the account and transmitting display data for the account that includes the postings received from the users. The postings are defined along the timeline. The method includes receiving a timeline parameter including a beginning date and an ending date, filtering the postings received from the account holder and the users to generate filtered postings based on the received timeline parameter, and transmitting display data including the filtered postings for display along the timeline. The method is executed by a processor.

In a number of implementations, a method for modifying a social timeline includes generating data to display a timeline graphic. The time graphic includes a chronology bar that is associated with at least two dates. The method further includes associating image data with the at least two dates to display images along the timeline graphic. The images describe a life story of an account holder. The method includes generating data to allow the account holder to post a comment to the life story along the timeline graphic.

In various implementations, the at least two dates are configured to be displayed as a portion of the chronology bar.

In a number of implementations, the comment is posted in response to a question asked by a user to the account holder.

In several implementations, a non-transitory computer-readable medium encoding instructions for modifying a social timeline that, in response to execution by a computing device, cause the computing device to perform operations is described. The operations include generating data to display a timeline graphic. The time graphic includes a chronology bar that is associated with at least two dates. The operations further include associating image data with the at least two dates to display images along the timeline graphic. The images describe a life story of an account holder. The operations include generating data to allow the account holder to post a comment to the life story along the timeline graphic.

In various implementations, the at least two dates are configured to be displayed as a portion of the chronology bar.

In a number of implementations, the comment is posted in response to a question asked by a user to the account holder.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
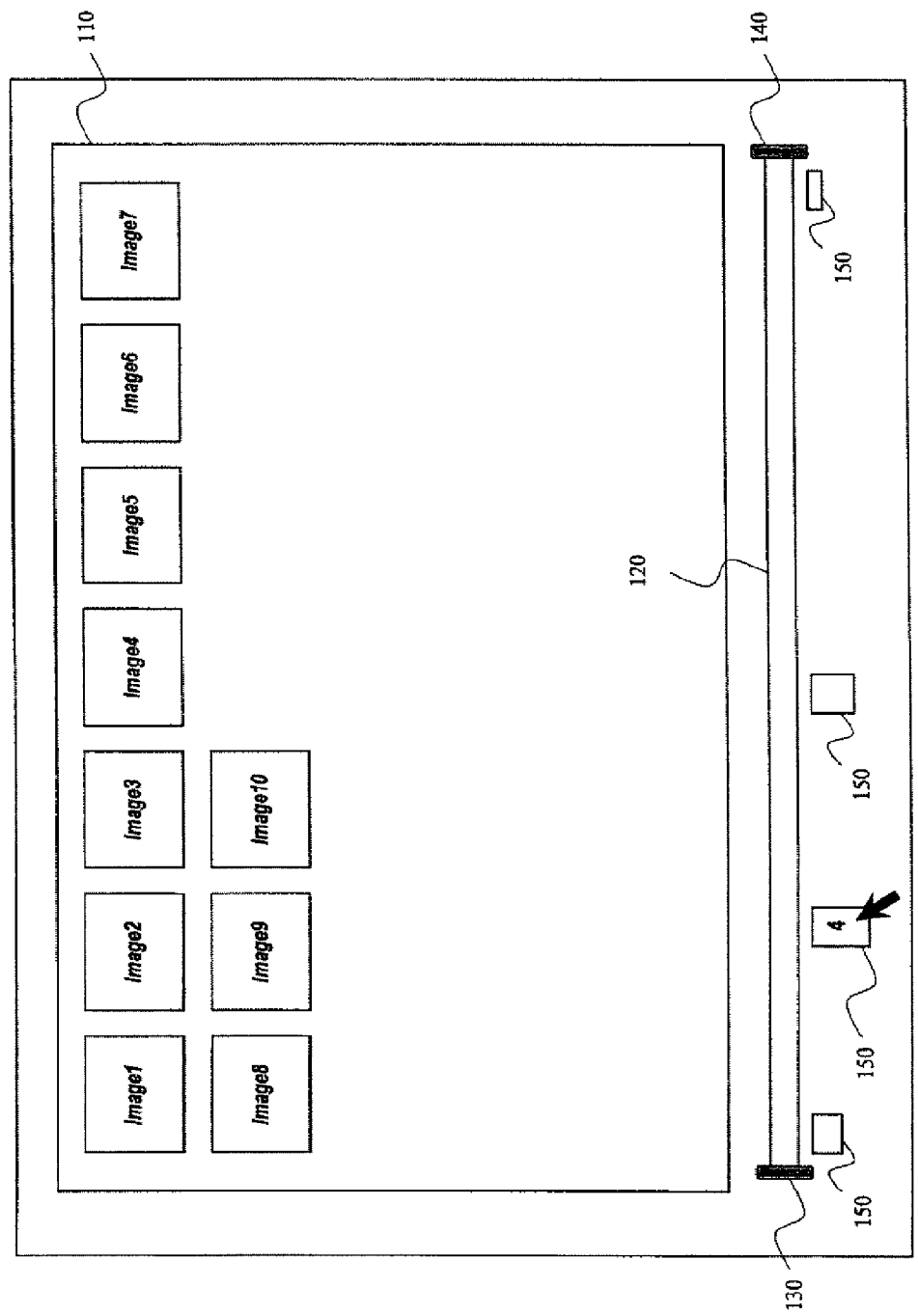
FIG. 1 is a schematic representation of a prior art GUI.
Figure 2:
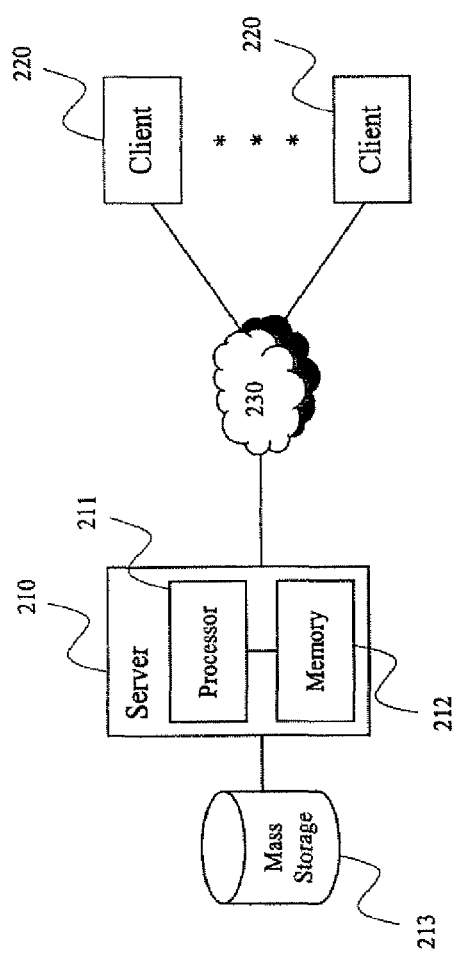
FIG. 2 illustrates a networked computer environment in which systems and methods according to embodiments of the present invention may be implemented.

FIG. 2 illustrates a networked computer environment in which systems and methods according to embodiments of the present invention may be implemented. As shown, the networked computer environment includes a server computer 210 and a plurality of client computers 220 (only two of which are shown). The server computer 210 and the client computers 220 are connected over a computer network 230, e.g., the Internet. The components of the server computer 210 that are illustrated in FIG. 2 include a processor 211 and a system memory 212. The server computer 210 is connected to a mass storage unit 213 that stores the contents managed by the server computer 210. Each client computer 220 includes conventional components of a computing device, e.g., a processor, system memory, a hard disk drive, input devices such as a mouse and a keyboard, and output devices such as a monitor (not shown).

The server computer 210 is programmed to operate as a network server that communicates with the client computers 220. In the embodiments of the present invention described herein, the server computer 210 is programmed as a web server that communicates with the client computers 220 using the TCP/IP protocol, and hosts a web site that can be accessed by the client computers 220. The client computers 220 are programmed to execute web browser programs and access the web pages managed by the server computer 210 by specifying a uniform resource locator (URL) for the server computer 210 into the browser.

The server computer 210 manages the contents stored in the mass storage unit 213 using a relational database software. The contents include profile data of the registered users of the web site. The profile data specify: user ID, password, name, email, address including zip code, gender, marital status, date of birth, occupation, a pointer to an image file, various permission settings, and other similar data. The contents further include interview questions, multimedia files such as image files, video files, audio files and flash animation files, life stories posted by the users, commentaries made to the posted life stories, user-defined private circle data, and such other data needed by the server computer 210 to process data received from the users and render web pages requested by the users.

In the embodiments of the present invention described below, users are respectively operating the client computers 220 that are connected to the server computer 210 over the Internet. Also, web pages that are displayed to a user are transmitted from the server computer 210 to that user's client computer 220 and processed by the web browser program stored in that user's client computer 220 for display through the monitor of that user's client computer 220.

Figure 3A:
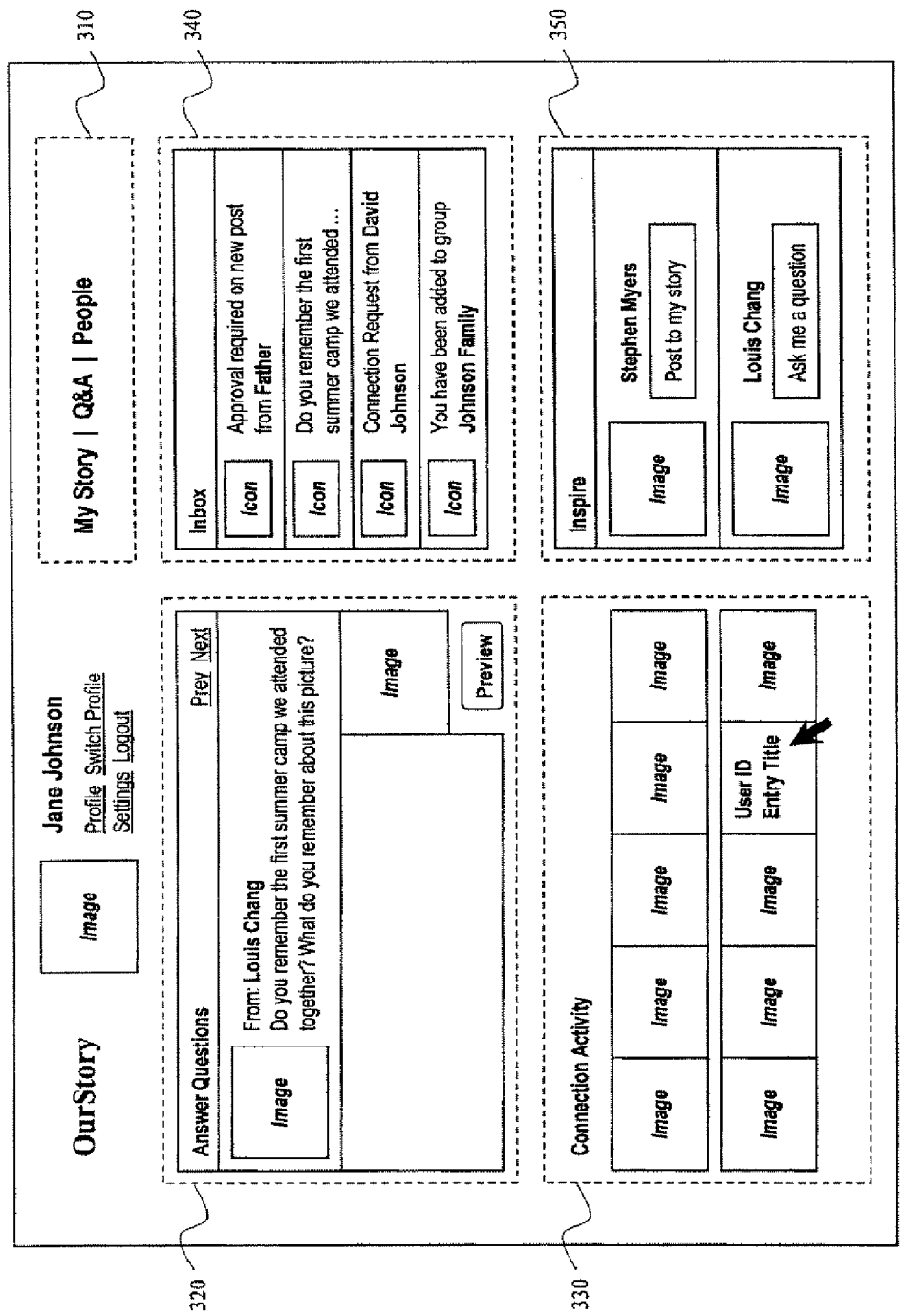
FIG. 3A is a schematic representation of a sample web page that includes a GUI according to a first embodiment of the present invention.

FIG. 3A is a schematic representation of a web page that is generated by the server computer 310 and transmitted to a user for display when the user accesses the web site managed by the server computer 310, and logs in using his or her user ID and password. The web page identifies the web site "OurStory" and the user who logged in with the user's name (Jane Johnson) and the user's image. The user can access her life stories by accessing the My Story hyperlink provided in a navigation section 310 of the web page. Other hyperlinks are provided on the web page to allow the user to view and change her profile (Profile hyperlink) and the account settings (Settings hyperlink).

The web site permits a single registered user to keep multiple profiles and maintain life stories for each person, group, and sometimes fictional characters, represented in the profiles. This feature may be used in situations where it is preferred to write the life stories from a third person point of view, or for a group of people (e.g., the Smith family or the 1980 U.S. Olympic hockey team) or a fictional character, or where the subject of the life stories is not computer savvy.

The Switch Profile hyperlink is provided to users who are maintaining multiple profiles to allow such users to switch to another profile and view and manage the life stories of the person, group, or fictional character represented in the other profile.

The web page further provides various other graphical user interface (GUI) elements. They include a navigation section 310, a question section 320, an image gallery 330, an inbox 340, and a collaboration section 350.

The navigation section 310 includes hyperlinks to web pages that are used to view, modify or add to the user's life stories (My Story), interview questions (Q&A), and relationships (People).

The question section 320 displays the most recent question that has been posed to the user and various other information associated with the question, including the name and image of the person asking the question, any image attached to the question by the person, and a text input field in which the user can answer the question. The question section 320 also provides question navigation hyperlinks "Previous" and "Next" using which the user can turn to the previous question or the next question that is in the queue of questions that have been posed to this user. The input of the answer followed by a click on the Preview button causes the display of a preview web page, using which the user can either publish the answer as a life story or cancel it. If the user publishes the answer, the server computer 210 saves the answer and the associated image in the mass storage unit 213. Further, in response to either the publishing or canceling action, the next question in the queue is displayed to the user. The user may also delete a question from the queue of questions by clicking on the "Delete" hyperlink. In response to this action, the next question in the queue is displayed to the user.

The image gallery 330 represents the GUI according to a first embodiment of the present invention. It provides the user with a pictorial snapshot of the more recent activities by other users who are connected to the user or by those who belong to a special group defined by the user, e.g., the user's immediate family or the user's closest friends. For simplicity in the following description, these other users will be referred to as connected users. The activities that are tracked by the image gallery 330 include recent posts of life stories by the connected users and recent comments made by them to the user's life stories.

In the example of the image gallery 330 shown in FIG. 3A, two rows of interactive regions for thumbnail images are displayed to the user. The top row corresponds to the most recent posts of life stories by connected users. The bottom row corresponds to the most recent comments that connected users have made to the user's life stories. When images are not available, the textual information corresponding to a life story or comment is displayed instead. When the user positions a mouse pointer on top of a thumbnail image, textual information of the life story corresponding to that thumbnail image is displayed. The textual information may be the name or user ID of the user who posted the life story or comment and the title of the life story or comment. Excerpts of the text narrative of the life story may also be displayed. The display order of the thumbnail image is determined based on how recent the life story or comment was posted, with the most recent posts being displayed on the left and less recent ones to the right thereof. A click on any interactive region hyperlinks the user to the thread corresponding to that region. A "thread" consists of a post and any comments made concerning the post. The user can input his or her comments to another user's life story or respond to another user's comments upon viewing the thread and accessing a hyperlink that is provided for such inputs.

Figure 3B:
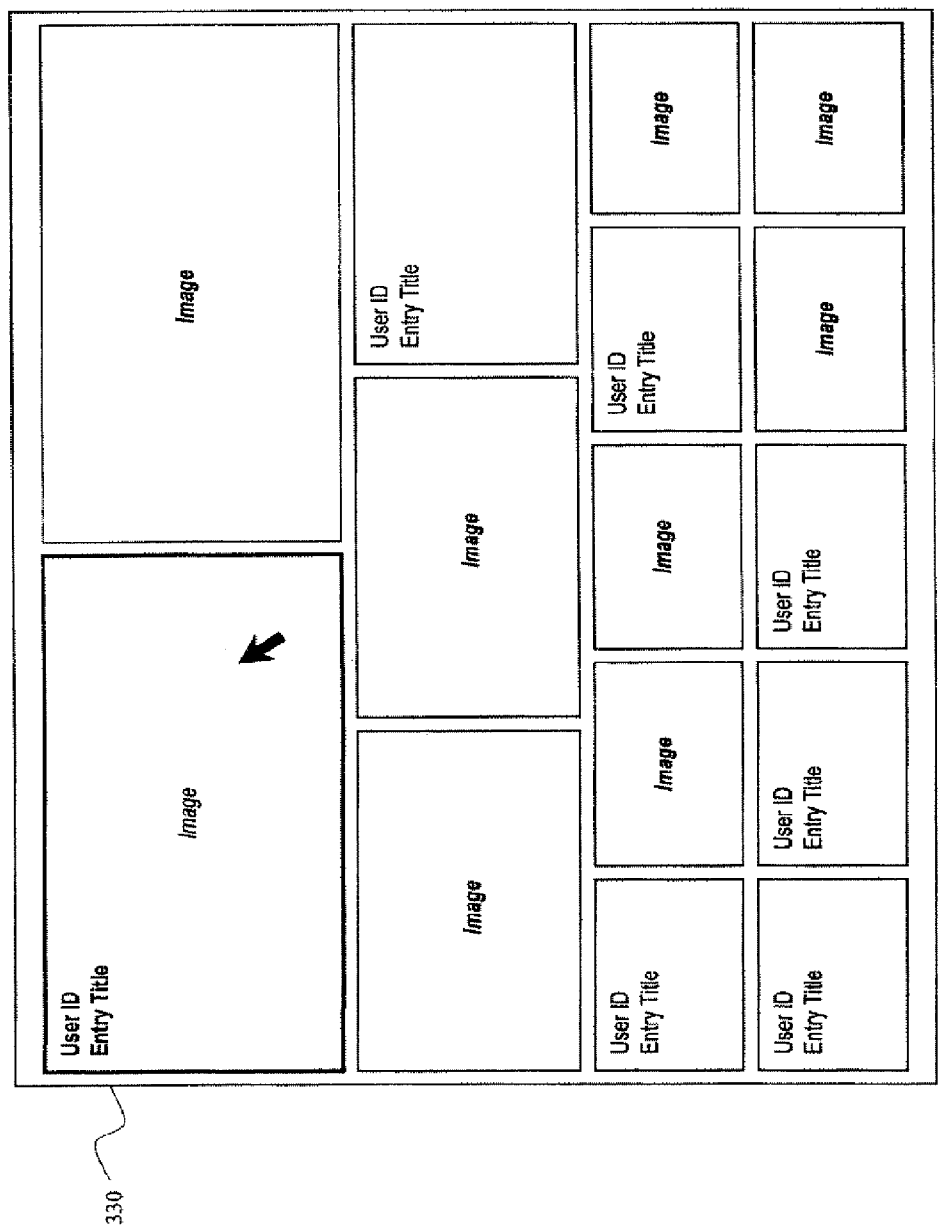
FIG. 3B illustrates another GUI according to a first embodiment of the present invention.

In the example of the image gallery 330 shown in FIG. 3B, four rows of interactive regions for thumbnail images are displayed to the user. The topmost row is the tallest and two interactive regions are provided in that row. The second row from the top is the next tallest and three interactive regions are provided in that row. The third and fourth rows from the top are of the same height. They are the shortest of the four rows and five interactive regions are provided in each of these rows. When images are not available, the textual information corresponding to a life story or comment is displayed instead. The top-left region corresponds to the most recent life story or comment posted by a connected user. The top-right region corresponds to the next most recent life story or comment posted by a connected user. The leftmost region in the second row corresponds to the next most recent life story or comment posted by a connected user, and so forth. When the user positions a mouse pointer on top of a thumbnail image, textual information of the life story corresponding to that thumbnail image is displayed and the image is partially masked. The textual information may be the name or user ID of the user who posted the life story or comment and the title of the life story or comment. Excerpts of the text narrative of the life story may also be displayed. A click on any interactive region hyperlinks the user to the thread corresponding to that region. The user can input his or her comments to another user's life story or respond to another user's comments upon viewing the thread and accessing a hyperlink that is provided for such inputs.

The image gallery 330 may also include thumbnail images of additional categories of posts. A third category of posts may be those that do not necessarily depict a life story but are instructional, informational, or inspirational in nature. A fourth category of posts may be those that are system generated to encourage users to post their life stories.

When the web page that includes the image gallery 330 is loaded from the server computer 210. the data necessary to generate the image gallery 330 may be retrieved synchronously with (i.e., at the time of) the request for the web page including the image gallery 330. The synchronous loading method is described in conjunction with FIG. 5A. If the retrieval time of the synchronous loading method, however, is expected to be too long, an asynchronous loading method described in conjunction with FIG. 5B may be used instead.

The image gallery 330 is populated with images or replacement text for a user with reference to the notification settings of the user. The account settings or the user profile may be used to specify this setting. The notification options include "E-mail Only" which means that the user will be notified through e-mail but not through the image gallery 330, "New Threads Only" which means that the user will be notified through e-mail and the image gallery 330 only when new threads are created by other users, and "Any Post" which means that the user will be notified through e-mail and the image gallery 330 of submissions of any posts and comments by other users who have connected to the user. The user also has the option of turning notification ON for individual threads.

The inbox 340 displays messages generated by the web site in response to actions taken by the other users of the web site. The messages include notices of actions taken by other users (e.g., "You have been added to group Johnson Family") and summaries of tasks that the user has been asked to complete (e.g., "Approval required on new post from Father" and "Connection Request from David Johnson"). An icon is displayed alongside each message to help the user quickly identify the content of the message.

The collaboration section 350 provides hyperlinks to a web page used to post a life story on behalf of another user and a web page used to ask questions to another user. The identity of the other user is displayed in this section along with that person's image. Only those users who have given the user sufficient access rights will appear in this section. In the example given here, Jane Johnson has the right to post stories on behalf of Stephen Myers, and Jane Johnson has the right to ask Louis Chang questions.

Figure 4A:
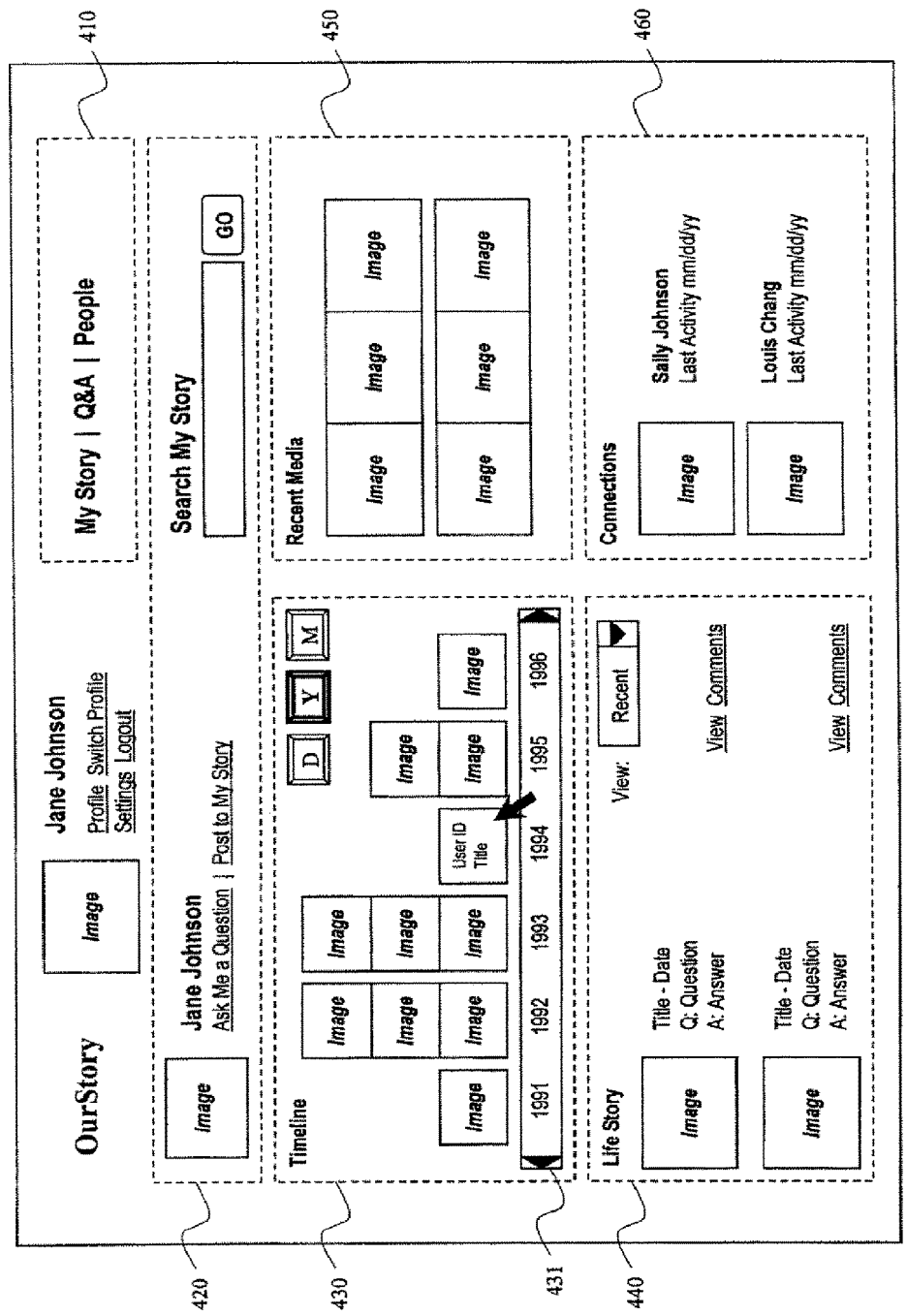
FIGS. 4A and 4B are schematic representations of sample web pages that include a GUI according to a second embodiment of the present invention.
Figure 4B:
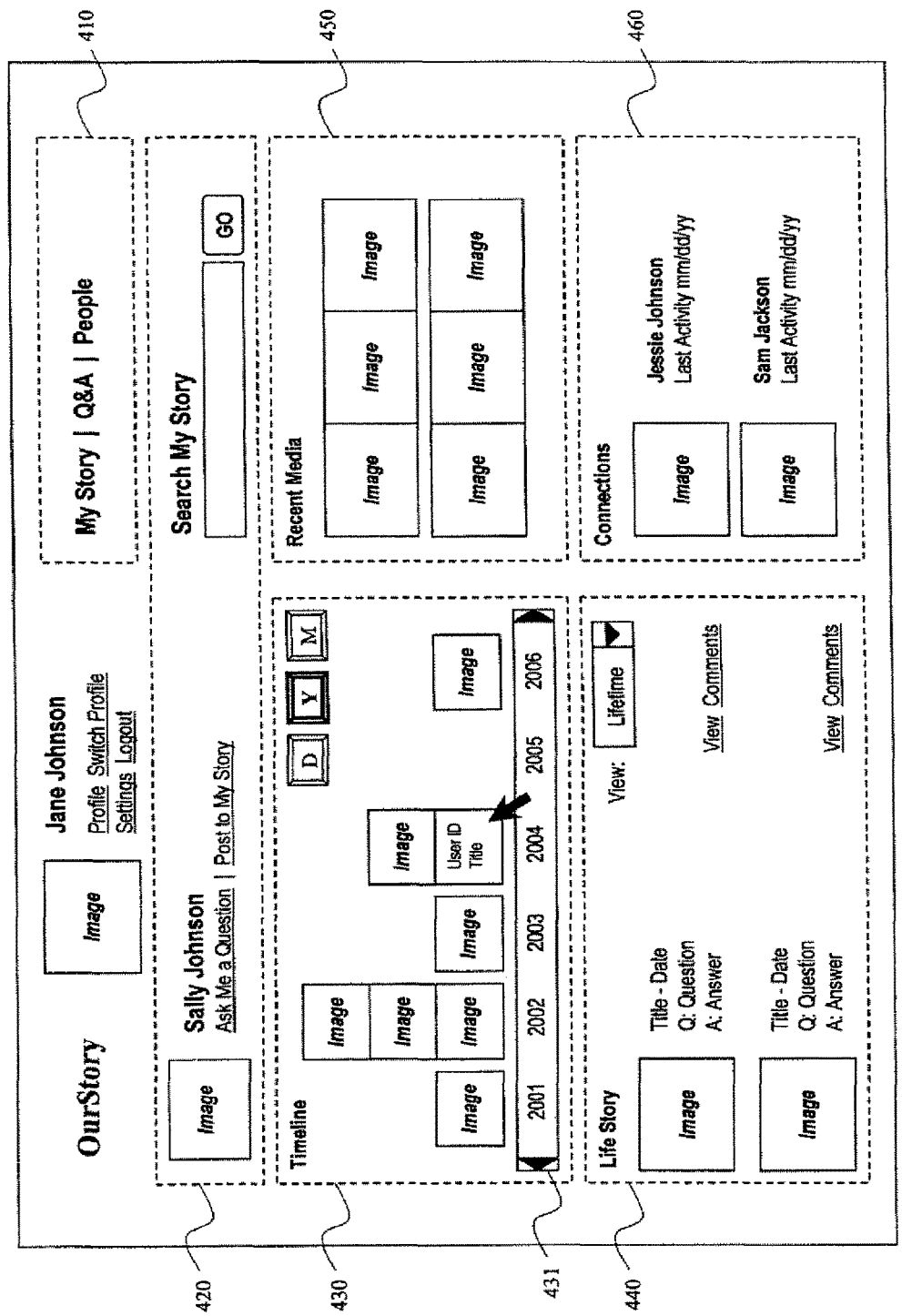

FIG. 4A is a schematic representation of the web page that is generated by the server computer 210 and transmitted to a user for display when the user selects the My Story hyperlink from the navigation section 310. FIG. 4B is a schematic representation of the web page that is generated by the server computer 210 and transmitted to a user for display when the user accesses the life stories of another user, Sally Johnson. Both web pages provide a navigation section 410 which functions in the same manner as the navigation section 310 of FIG. 3A. They also include a profile ID section 420, a timeline section 430, a life story section 440, a recent media section 450 and a connection section 460.

The profile ID section 420 identifies the person whose life stories are presented on this web page. The profile ID section 420 also includes hyperlinks to web pages for asking questions (Ask Me a Question) and for posting life stories (Post to My Story). A search feature is provided in this section as well.

The timeline section 430 represents the GUI according to a second embodiment of the present invention. It presents the user's life stories pictorially using images from life stories organized according to a chronology bar 431. All of the images appearing on top of a specified time period correspond to posts that describe events of that time period. When the user positions a mouse pointer on top of an image, textual information of the life story corresponding to that image is displayed. The textual information may be the name or user ID of the user who posted the life story or comment and the title of the life story or comment. Excerpts of the text narrative of the life story may also be displayed. When images are not available, the textual information corresponding to a life story or comment is displayed instead. A click on any image hyperlinks the user to the life story corresponding to that image. When viewing the life story of another user, the user can input his or her comments to the other user's life story upon viewing the life story and accessing a hyperlink that is provided for such inputs. When viewing the user's own life story, the user can edit his or her life story or respond to a comment made by another user upon viewing the life story and accessing a hyperlink that is provided for such inputs.

The range of time periods represented by the chronology bar 431 can be changed by clicking on the arrows at the ends of the chronology bar. Clicking on the left arrow moves the life stories back in time and clicking on the right arrow moves the life stories forward in time. The scale of the chronology bar 431 may also be changed using the button controls labeled as "D" for decade, "Y" for year, and "M" for month. As shown in FIG. 4A, the "Y" button has been selected and so the current scale is year.

Figure 4C:
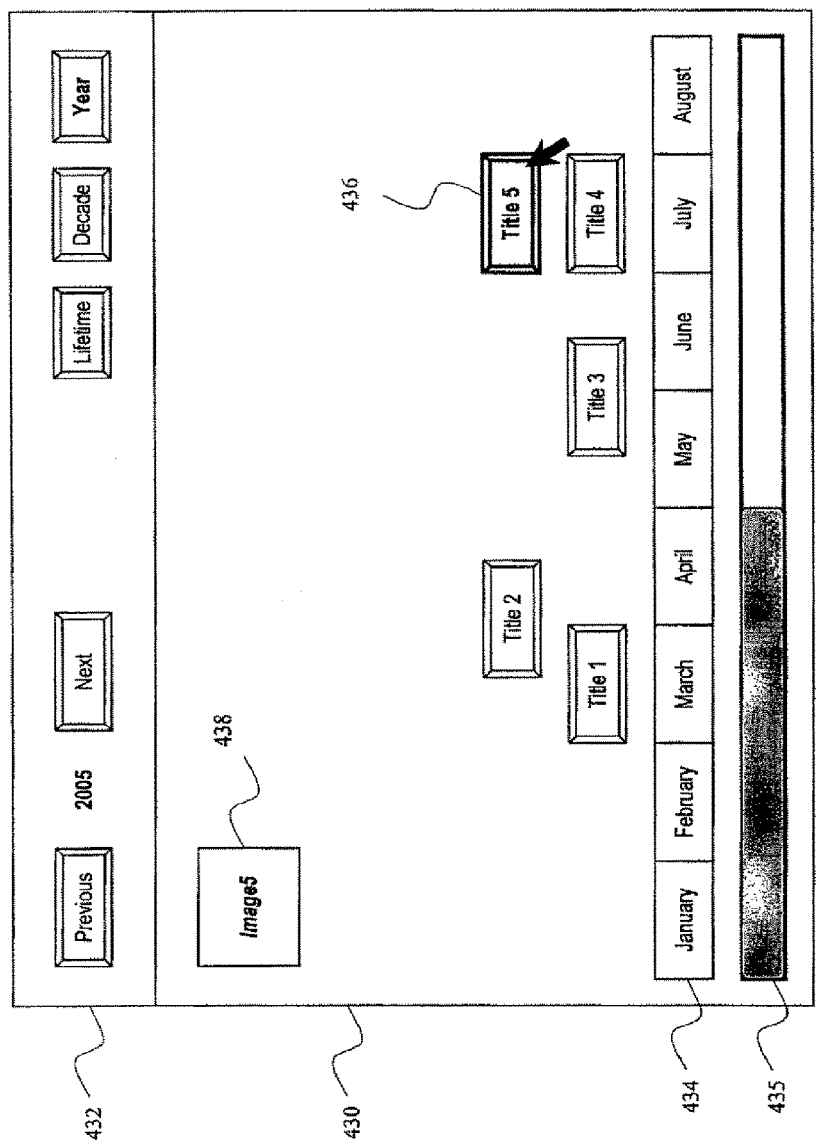
FIG. 4C illustrates another GUI according to a second embodiment of the present invention.

FIG. 4C is another example of the timeline section 430. This timeline section 430 includes a date control section 432, a chronology bar 434, a scroll bar 435 underneath the chronology bar 434, interactive regions 436 for displaying titles of life stories, and an image display region 438. The date range represented by the timeline section 430 is controlled by the date control section 432 and the scroll bar 435. As shown in FIG. 4C, the Year button has been selected in the date control section 432. Hence, the year is displayed in the date control section 432. The displayed year can be incremented by pressing the Next button or decremented by pressing the Previous button. Also, the months displayed in the chronology bar 434 can be changed by moving the scroll bar 435 to the left and right. In all cases, the interactive regions 436 for displaying titles of life stories are positioned in accordance with the dates entered for the life stories, and only those titles of life stories having dates within the date range defined by the chronology bar 434 are displayed. When the user positions a mouse pointer on top of an interactive region 436, the title of the life story corresponding to that region is highlighted and the image corresponding to that life story is displayed in the image display region 438. A click on any interactive region 436 hyperlinks the user to the life story corresponding to that region. When viewing the life story of another user, the user can input his or her comments to the other user's life story upon viewing the life story and accessing a hyperlink that is provided for such inputs. When viewing the user's own life story, the user can edit his or her life story or respond to a comment made by another user upon viewing the life story and accessing a hyperlink that is provided for such inputs.

Upon viewing the timeline section 430 of another user, the user may ask the other user a question using the Ask Me a Question hyperlink. The user might do this because an event that was commonly experienced by the two users is not represented in the timeline section 430, or the user is curious about the events in a particular time period, e.g., childhood, of the other user and finds that there very few life stories for that time period.

The life story section 440 provides a display of the life stories of the user. Each life story normally includes a title, the date of the event depicted in the life story, a word account of the event, and an image representative of the event. If a question asked by another user prompted the posting of a life story, the question is also displayed. A life story can be viewed and edited by clicking on the View hyperlink. A life story thread including comments made to the life story can be viewed by clicking on the Comments hyperlink. The life stories shown in the display field are sorted based on the selection made using the View drop-down menu. The available selections include: "Recent" which sorts the life stories chronologically by the event date; "Recent" which sorts the life stories chronologically by the posting date; "Location" which sorts the life stories according to the event location; and "People" which sorts the life stories according to the people depicted in the life stories.

The recent media section 450 includes recent images that have been attached to posts and comments by the user. It provides a snapshot of the user's recent activities at the web site. A click on any image causes the thread containing the image to be displayed.

The connection section 460 provides a list of connected users and the date of their most recent activity at the web site. A click on the name or image of any connected user causes the My Story web page of that user to be displayed.

Figure 5A:
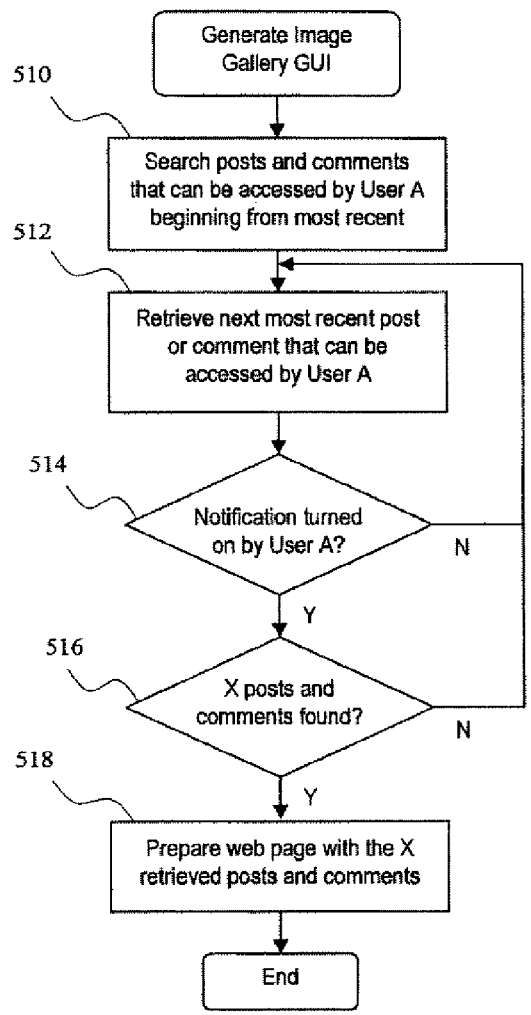
FIG. 5A is a flow diagram that illustrates a synchronous method carried out by the server computer to generate the GUI according to a first embodiment of the present invention.

FIG. 5A is a flow diagram that illustrates a synchronous method carried out by the server computer 210 to generate the GUI according to a first embodiment of the present invention. In the example given herein, the web page that includes the image gallery 330 is being prepared by the server computer 210 for transmission to the client computer 220 of User A, and the data necessary to generate the image gallery 330 is retrieved synchronously with (i.e., at the time of) the request made by the client computer 220 of User A for the web page including the image gallery 330.

In step 510, the server computer 210 begins search of the posts and comments that can be accessed by User A beginning from the most recent. The posts and comments that can be accessed by User A include those post and comments that are submitted by those users who have connected to User A. The posts and comments are examined one by one in the loop defined by steps 512-516. In step 512, the next most recent post or comment that can be accessed by User A is retrieved for examination. If notification has been turned ON by User A for the thread containing the retrieved post or comment (i.e., if any of the following applies: (i) User A has turned notification ON for any post; (ii) User A has turned notification ON for new threads and this particular thread is a new thread; and (iii) User A has turned notification ON for this particular thread), the flow proceeds to step 516. In step 516, a check is made to see if a predetermined number of post or comments has been retrieved (e.g., X=13). If so, the web page containing the image gallery 330 is prepared with the X retrieved posts and comments. If the condition in either step 514 or 516 is false, the flow returns to step 512 where the next most recent post or comment that is readable by User A is retrieved for examination.

The flow diagram of FIG. 5A represents the synchronous method for generating the image gallery 330 shown in FIG. 3B. It can be modified so that it represents the synchronous method for generating the image gallery 330 shown in FIG. 3A, by searching for and retrieving X1 (e.g., X1=5) most recent posts and X2 (e.g., X2=5) most recent comments.

Figure 5B:
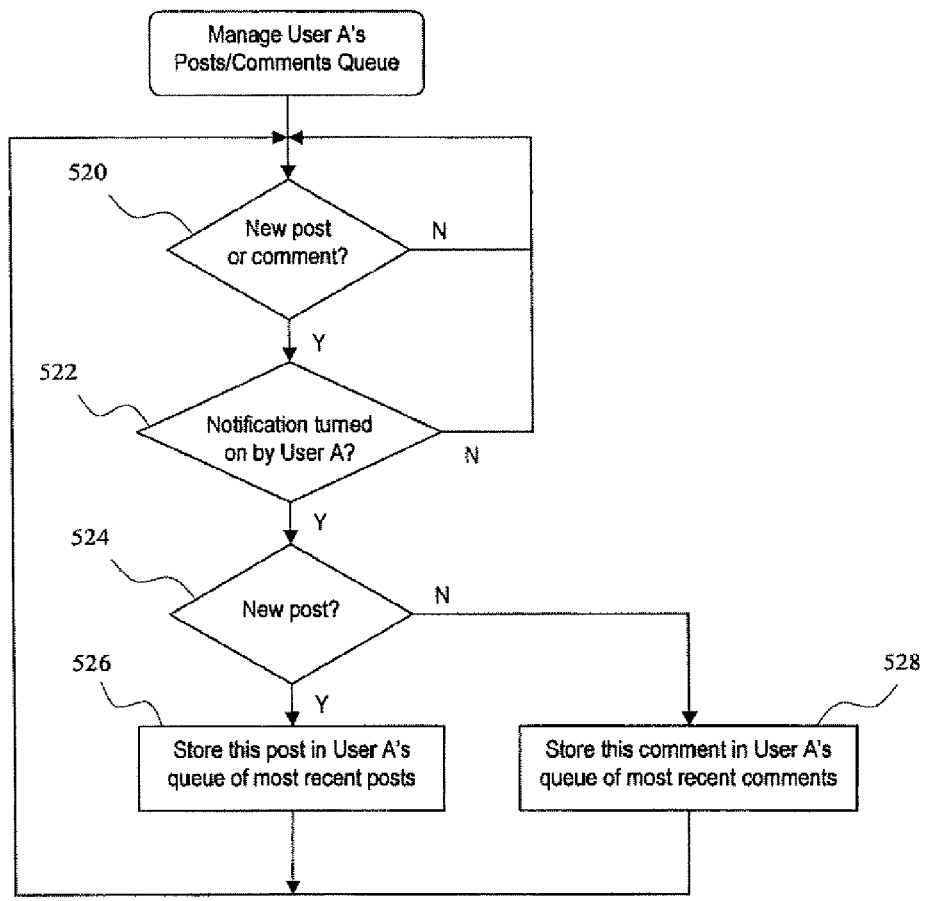
FIG. 5B is a flow diagram that illustrates an asynchronous method carried out by the server computer to generate the GUI according to a first embodiment of the present invention.

The method illustrated in the flow diagram of FIG. 5B sets forth steps carried out by the server computer 210 to prepare the data necessary to generate the image gallery 330 in an asynchronous manner. In the example given herein, the data necessary to generate the image gallery 330 shown in FIG. 3A is prepared prior to the request made by the client computer 220 of User A for the web page including the image gallery 330 so that the requested web page can be loaded quickly upon request. If User A has turned all notifications OFF, the flow diagram of FIG. 5B is not executed for User A.

On the other hand, if User A has turned notification ON for any new post or comment, or for any new thread, or for any individual thread, the loop defined by steps 522-528 is executed whenever the server computer 210 recognizes that a new post or comment has been submitted (step 520). In step 522, a check is made to see if User A should be notified of this post or comment. If the notification has been turned on by User A for the thread containing this new post or comment (i.e., if any of the following applies: (i) User A has turned notification ON for any post; (ii) User A has turned notification ON for new threads and this particular thread is a new thread; and (iii) User A has turned notification ON for this particular thread), the flow proceeds to step 524. A new post is stored in the front of User As queue of most recent posts (step 526) and a new comment is stored in the front of User As queue of most recent comments (step 528). The flow then returns to step 520.

If the server computer 210 receives a request from User A for the web page including the image gallery 330 shown in FIG. 3A, the server computer 210 retrieves the first X1 (e.g., X1=5) posts from the queue of most recent posts and the first X2 (e.g., X2=5) from the queue of most recent comments, and prepares the requested web page using the retrieved posts and comments. Because the server computer 210 does not need to execute loop logic and merely retrieves the necessary data from memory, the loading time for the web page that includes the image gallery 330 is accelerated relative to the synchronous loading method.

The method illustrated in the flow diagram of FIG. 5B can be modified to have a single queue of most recent posts and comments to prepare the data necessary to generate the image gallery 330 shown in FIG. 3B. In this example, if the server computer 210 receives a request from User A for the web page including the image gallery 330 shown in FIG. 3B, the server computer 210 retrieves the first X (e.g., X=15) posts from the queue of most recent posts and comments, and prepares the requested web page using the retrieved posts and comments. Because the server computer 210 does not need to execute loop logic and merely retrieves the necessary data from memory, the loading time for the web page that includes the image gallery 330 is accelerated relative to the synchronous loading method.

Figure 6:
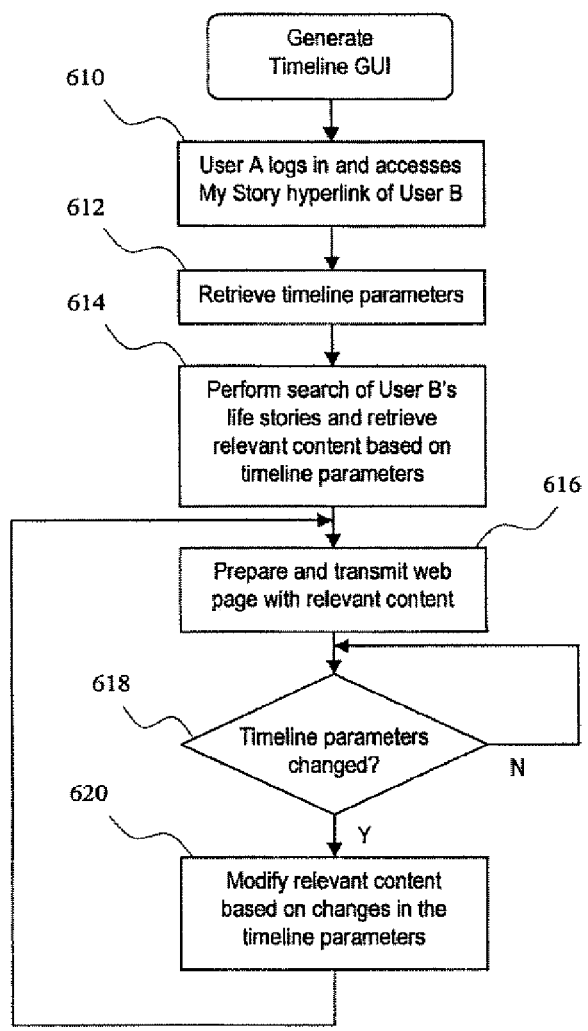
FIG. 6 is a flow diagram that illustrates the method steps carried out by the server computer to generate the GUI according to a second embodiment of the present invention.

FIG. 6 is a flow diagram that illustrates the method steps carried out by the server computer to generate the GUI according to a second embodiment of the present invention. In the example given herein, the timeline section 430 shown in FIG. 4A is generated for User A when User A accesses the My Story web page of User B and modified in accordance with User As modifications to the date ranges of the timeline.

In step 610, User A logs in and accesses the My Story web page of User B. The default or the most recently used timeline parameters are then retrieved in step 612. The timeline parameters include the beginning date and ending date of the timeline, and the timeline scale, e.g., lifetime, decade, year, month. In step 614, a search is performed on User B's life stories, and the life stories of User B that User A has permission to view and are within the date range specified by the timeline parameters, are retrieved. The retrieved life stories are used to prepare the web page including the timeline section 430 and the web page is transmitted to User A for display (step 616). During preparation of the web page, the server computer 210 determines the display position of each life story in the timeline section 430 relative to the chronology bar 431, so that life stories with dates are aligned vertically with respect to the date printed on or next to the chronology bar 431. Life stories with rough dates, such as month/year or just the year, may have the missing months and/or days pre-assigned by the server computer 210 so that they too can be displayed in the timeline section 430.

A check is made in accordance with step 618 to see if any of the timeline parameters have changed, e.g., by a user's manipulation of any of the GUI controls in the timeline section 430. If there has been a change, the life story set that was used to prepare the web page is modified in accordance with the modifications of the timeline parameters (step 620). For example, if the date range has been expanded, additional life stories are retrieved. If the date range has been shrunk, some of the retrieved life stories are discarded. The flow then returns to step 616. where the modified life story set is used to prepare the web page including the timeline section 430 and the web page is transmitted to User A for display. Steps 618 and 620 are executed as before.

While particular embodiments according to the invention have been illustrated and described above, those skilled in the art understand that the invention can take a variety of forms and embodiments within the scope of the appended claims.

What is claimed is:

1. A method comprising:

storing, in a storage unit of a social network system, a plurality of queues of posts that each correspond to one of a plurality of user profiles in the social network system, wherein the user profiles comprise a first user profile, a second user profile, and a third user profile, wherein the social network system allows for a thread of one or more comments on each post in the queues of posts, wherein the queues of posts comprise a second queue of posts for the second user profile, wherein the social network system allows ones of the user profiles to be connected within the social network system, wherein the second user profile is connected to the first user profile and the third user profile within the social network system, wherein the social network system provides a first graphical user interface for each user profile among the user profiles that presents posts from a queue of posts among the queues of posts for the user profile, and wherein the social network system provides each user profile in the user profiles a second graphical user interface that presents posts from the queues of posts for ones of the user profiles that are connected to the user profile;

receiving a request from a computing device for the first user profile to add a post to the second queue of posts for the second user profile;

determining that a permission setting for the second user profile indicates that ones of the user profiles have permission to add posts to the second queue of posts for the second user profile, wherein the permission setting is provided to the social network system before the request to add the post to the second queue of posts for the second user profile is received;

determining that the permission setting for the second user profile indicates that an approval from the second user profile is required to add the post to the second queue of posts before providing the post from the second queue posts in the second graphical user interface to computing devices for the user profiles;

storing the post in response to determining that the permission setting indicates that the ones of the user profiles have permission and that the approval from the second user profile is required before providing the post from the second queue posts in the second graphical user interface;

providing a notification to the second user profile in a message inbox that the request to add the post was received from the first user profile in response to determining that the permission setting for the second user profile indicates that the approval from the second user profile is required, wherein the message inbox for the second user profile presents messages generated by the social network system in response to actions taken by others of the user profiles, and wherein the messages for the actions are configured to comprise the notification regarding the approval of the post, a message regarding being added to a group of the user profiles, and a message regarding a connection request from one of the user profiles;

receiving the approval from a computing device for the second user profile in response to providing the notification;

adding, by a processor of the social network system, the post to the second queue of posts for the second user profile in response to receiving the approval; and providing the second graphical user interface to a computing device for the third user profile, wherein the second graphical user interface provided for the third user profile presents the post from the second queue of posts based on the second user profile being connected to the third user profile.

2. The method of claim 1, wherein determining that the permission setting for the second user profile indicates that the ones of the user profiles have permission comprises determining that the ones of the user profiles are connected to the second user profile within the social network system, and wherein the first user profile was connected to the second user profile within the social network system in response to having previously received a user input for the first user profile to invite a user for the second user profile to join the social network system or having previously received a user input for the second user profile to invite a user for the first user profile to join the social network system.

3. The method of claim 1, wherein determining that the permission setting for the second user profile indicates that the ones of the user profiles have permission comprises determining that the ones of the user profiles are connected to the second user profile within the social network system, and wherein the first user profile was connected to the second user profile within the social network in response to having previously received a user selection for the first user profile to connect to the second user profile or having previously received a user selection for the second user profile to connect to the first user profile.

4. The method of claim 1, wherein determining that the permission setting for the second user profile indicates that the ones of the user profiles have permission comprises determining that the permission setting for the second user profile indicates that any of the user profiles are permitted to add posts to the second queue of posts for the second user profile.

5. The method of claim 1, wherein the second queue of posts comprises a timeline, and wherein the method further comprises associating the post with the timeline based on a date associated with the post.

6. The method of claim 1, wherein a page of the second user profile within the social network system is accessed by the first user profile when a name of the second user profile or an image of the second user profile is selected by the first user profile, and wherein the name or the image of the second user profile is represented within social network connections of the first user profile.

7. A non-transitory computer-readable medium having instructions stored therein that, when executed by at least one processor, cause the processor to:

store, in a storage unit of a social network system, a plurality of queues of posts that each correspond to one of a plurality of user profiles in the social network system, wherein the user profiles comprise a first user profile, a second user profile, and a third user profile, wherein the social network system allows for a thread of one or more comments on each post in the queues of posts, wherein the queues of posts comprise a second queue of posts for the second user profile, wherein the social network system allows ones of the user profiles to be connected within the social network system, wherein the second user profile is connected to the first user profile and the third user profile within the social network system, wherein the social network system provides a first graphical user interface for each user profile among the user profiles that presents posts from a queue of posts among the queues of posts for the user profile, and wherein the social network system provides each user profile in the user profiles a second graphical user interface that presents posts from the queues of posts for ones of the user profiles that are connected to the user profile;

receive a request from a computing device for the first user profile to add a post to the second queue of posts for the second user profile;

determine that a permission setting for the second user profile indicates that ones of the user profiles have permission to add posts to the second queue of posts for the second user profile, wherein the permission setting is provided to the social network system before the request to add the post to the second queue of posts for the second user profile is received;

determine that the permission setting for the second user profile indicates that an approval from the second user profile is required to add the post to the second queue of posts before providing the post from the second queue posts in the second graphical user interface to computing devices for the user profiles;

store the post in response to the determination that the permission setting indicates that the ones of the user profiles have permission and that the approval froth the second user profile is required before providing the post from the second queue posts in the second graphical user interface;

provide a notification to the second user profile in a message inbox that the request to add the post was received from the first user profile in response to the determination that the permission setting for the second user profile indicates that the approval from the second user profile is required, wherein the message inbox for the second user profile presents messages generated by the social network system in response to actions taken by others of the user profiles, and wherein the messages for the actions are configured to comprise the notification regarding the approval of the post, a message regarding being added to a group of the user profiles, and a message regarding a connection request from one of the user profiles;

receive the approval from a computing device for the second user profile in response to the provision of the notification;

add, by the processor of the social network system, the post to the second queue of posts for the second user profile in response to the receipt of the approval; and provide the second graphical user interface to a computing device for the third user profile, wherein the second graphical user interface provided for the third user profile presents the post from the second queue of posts based on the second user profile being connected to the third user profile.

8. The computer-readable medium of claim 7, wherein, to determine that the permission setting for the second user profile indicates that the ones of the user profiles have permission, the instructions are further to cause the processor determine that the ones of the user profiles are connected to the second user profile within the social network system, and wherein the first user profile was connected to the second user profile within the social network system in response to having previously received a user input for the first user profile to invite a user for the second user profile to join the social network system or having previously received a user input for the second user profile to invite a user for the first user profile to join the social network system.

9. The computer-readable medium of claim 7, wherein, to determine that the permission setting for the second user profile indicates that the ones of the user profiles have permission, the instructions are further to cause the processor to determine that the ones of the user profiles are connected to the second user profile within the social network system, and wherein the first user profile was connected to the second user profile within the social network in response to having previously received a user selection for the first user profile to connect to the second user profile or having previously received a user selection for the second user profile to connect to the first user profile.

10. The computer-readable medium of claim 7, wherein, to determine that the permission setting for the second user profile indicates that the ones of the user profiles have permission, the instructions are further to cause the processor to determine that the permission setting for the second user profile indicates that any of the user profiles are permitted to add posts to the second queue of posts for the second user profile.

11. The computer-readable medium of claim 7, wherein the second queue of posts comprises a timeline, and wherein the instructions are further to cause the processor to associate the post with the timeline based on a date associated with the post.

12. A system comprising:

a storage unit, in a social network system, that stores a plurality of queues of posts that each correspond to one of a plurality of user profiles in the social network system, wherein the user profiles comprise a first user profile, a second user profile, and a third user profile, wherein the social network system allows for a thread of one or more comments on each post in the queues of posts, wherein the queues of posts comprise a second queue of posts for the second user profile, wherein the social network system allows ones of the user profiles to he connected within the social network system, wherein the second user profile is connected to the first user profile and the third user profile within the social network system, wherein the social network system provides a first graphical user interface for each user profile among the user profiles that presents posts from a queue of posts among the queues of posts for the user profile, and wherein the social network system provides each user profile in the user profiles a second graphical user interface that presents posts from the queues of posts for ones of the user profiles that are connected to the user profile; and a processor, in the social network system, that communicates with the storage unit to:

receive a request from a computing device for the first user profile to add a post to the second queue of posts for the second user profile;

determine that a permission setting for the second user profile indicates that ones of the user profiles have permission to add posts to the second queue of posts for the second user profile, wherein the permission setting is provided to the social network system before the request to add the post to the second queue of posts for the second user profile is received;

determine that the permission setting for the second user profile indicates that an approval from the second user profile is required to add the post to the second queue of posts before providing the post from the second queue posts in the second graphical user interface to computing devices for the user profiles;

store the post in response to the determination that the permission setting indicates that the ones of the user profiles have permission and that the approval from the second user profile is required before providing the post from the second queue posts in the second graphical user interface;

provide a notification to the second user profile in a message inbox that the request to add the post was received from the first user profile in response to the determination that the permission setting for the second user profile indicates that the approval from the second user profile is required, wherein the message inbox for the second user profile presents messages generated by the social network system in response to actions taken by others of the user profiles, and wherein the messages for the actions are configured to comprise the notification regarding the approval of the post, a message regarding being added to a group of the user profiles, and a message regarding a connection request from one of the user profiles;

receive the approval from a computing device for the second user profile in response to the provision of the notification;

add the post to the second queue of posts for the second user profile in response to the receipt of the approval; and provide the second graphical user interface to a computing device for the third user profile, wherein the second graphical user interface provided for the third user profile presents the post from the second queue of posts based on the second user profile being connected to the third user profile.

13. The system of claim 12, wherein, to determine that the permission setting for the second user profile indicates that the ones of the user profiles have permission, the processor is further to determine that the ones of the user profiles are connected to the second user profile within the social network system, and wherein the first user profile was connected to the second user profile within the social network system in response to having previously received a user input for the first user profile to invite a user for the second user profile to join the social network system or having previously received a user input for the second user profile to invite a user for the first user profile to join the social network system.

14. The system of claim 12, wherein, to determine that the permission setting for the second user profile indicates that the ones of the user profiles have permission, the processor is further to determine that the ones of the user profiles are connected to the second user profile within the social network system, and wherein the first user profile was connected to the second user profile within the social network in response to having previously received a user selection for the first user profile to connect to the second user profile or having previously received a user selection for the second user profile to connect to the first user profile.

15. The system of claim 12, wherein, to determine that permission setting for the second user profile indicates that the ones of the user profiles have permission, the processor is further to determine that the permission setting for the second user profile indicates that any of the user profiles are permitted to add posts to the second queue of posts for the second user profile.

16. The system of claim 12, wherein the second queue of posts comprises a timeline, and wherein the processor is further to associate the post with the timeline based on a date associated with the post.

* * * * *